United States Patent
Takabatake

(10) Patent No.: US 9,785,547 B2
(45) Date of Patent: Oct. 10, 2017

(54) DATA MANAGEMENT APPARATUS AND METHOD

(71) Applicant: HITACHI, LTD., Tokyo (JP)

(72) Inventor: Motoyasu Takabatake, Tokyo (JP)

(73) Assignee: HITACHI, LTD., Tokyo (JP)

( * ) Notice: Subject to any disclaimer, the term of this patent is extended or adjusted under 35 U.S.C. 154(b) by 47 days.

(21) Appl. No.: 14/909,615

(22) PCT Filed: Feb. 13, 2014

(86) PCT No.: PCT/JP2014/053276
§ 371 (c)(1),
(2) Date: Feb. 2, 2016

(87) PCT Pub. No.: WO2015/121938
PCT Pub. Date: Aug. 20, 2015

(65) Prior Publication Data
US 2016/0188461 A1    Jun. 30, 2016

(51) Int. Cl.
*G06F 12/00* (2006.01)
*G06F 12/02* (2006.01)
*G06F 3/06* (2006.01)

(52) U.S. Cl.
CPC .......... *G06F 12/0253* (2013.01); *G06F 3/064* (2013.01); *G06F 3/0608* (2013.01); *G06F 3/0643* (2013.01); *G06F 3/0652* (2013.01); *G06F 3/0679* (2013.01); *G06F 12/0246* (2013.01); *G06F 2212/1016* (2013.01); *G06F 2212/1044* (2013.01); *G06F 2212/2022* (2013.01); *G06F 2212/7202* (2013.01); *G06F 2212/7205* (2013.01)

(58) Field of Classification Search
None
See application file for complete search history.

(56) References Cited

U.S. PATENT DOCUMENTS

2012/0265924 A1    10/2012  Purdy et al.

*Primary Examiner* — John A Lane
(74) *Attorney, Agent, or Firm* — Volpe and Koenig, P.C.

(57) ABSTRACT

A data management apparatus for reducing the occurrence of garbage collection, and preventing deterioration in the performance of writing data into an SSD. The data management apparatus includes a data management unit which manages key-value data stored in the SSD, and a file management unit which creates a file of a predetermined size in accordance with a request from the data management unit, and manages the created file. The file management unit creates a file having a size of an integral multiple of a block in the SSD, the data management unit requests file management unit to write the key-value data to be stored in the file, and manages a number of the effective key-value data in each file by invalidating pre-update data of the updated key-value data and the deleted key-value data, and requests the file management unit to delete the file no longer storing the effective key-value data.

12 Claims, 6 Drawing Sheets

FIG.5

| Key | FILE NAME | OFFSET | DATA SIZE |
|---|---|---|---|
| Key1 | File1 | 128 | 0.72 |
| Key2 | File2 | 16 | 0 |
| ... | ... | ... | ... |

| FILE NAME | Key COUNT | UNUSED CAPACITY | EFFECTIVE DATA AMOUNT |
|---|---|---|---|
| File1 | 1 | 0 | 1.2 |
| File2 | 2 | 32 | 0.8 |
| ... | ... | ... | ... |

32A  32B  32C  32D

32

DATA MANAGEMENT APPARATUS AND METHOD

TECHNICAL FIELD

The present invention relates to a data management apparatus and a data management method, and in particular can be suitably applied to a data management apparatus which stores data in an SSD (Solid State Drive) based on the KVS (Key-Value Store) method and manages the stored data.

BACKGROUND ART

In recent years an SSD is being broadly used as a storage device. An SSD is a storage device that uses a semiconductor memory, such as a flash memory, as the storage medium, and yields advantages in that it yields superior access performance and thrifty power consumption, and possesses resistance against vibration and shock, in comparison to hard disk devices.

With an SSD, the storage area is managed by being divided into unit areas referred to as a block of a predetermined size (for instance, 2 [MB]). At this point, writing of data into the SSD is performed in units referred to as a page having a size (for instance, 4 [kB]) that is smaller than a block, but the written data can only be erased in block units.

Thus, with an SSD, the update or erasure of data written into a certain block is performed via processing known as so-called garbage collection, where data of that block is once migrated to another block, and then all data stored in the migration source block is erased.

Meanwhile, in recent years a method referred to as KVS is attracting attention as one data storage/management method. KVS is a method of adding a unique character string or numerical value referred to as a key to the data (value) to be stored, and storing the data and the key as a set, and the intended data can be read from the storage device by designating the corresponding key. Note that, in the ensuing explanation, the data to be stored is referred to as a Value, the key is referred to as a Key, and the data in which a Key has been added to a Value is referred to as Key-Value data.

PTL 1 below discloses a method of additionally storing data, in a log-structured manner, in an SSD as a data management method based on KVS for an SSD. According to this data management method, there is an advantage in that the deterioration in the performance caused by random access, which is a characteristic of an SSD, can be reduced.

CITATION LIST

Patent Literature

[PTL 1] Specification of U.S. Patent Publication No. 2012/0265924

SUMMARY OF INVENTION

Technical Problem

However, according to the data management method disclosed in PTL 1, the foregoing garbage collection occurs when data is continuously written into an SSD, the write process goes around the storage area of the SSD, and it becomes necessary to write data in a block in which data has been previously stored, and there is a problem in that the writing performance will deteriorate by that much.

Meanwhile, among the server apparatuses equipped with the KVS function, there are types that are configured to temporarily retain the Key-Value data in a memory of the server apparatus, and write the Key-Value data retained in the memory into a storage device such as a hard disk device or an SSD at a predetermined timing.

With this kind of server apparatus, since there is a possibility of losing the Key-Value data, which has not yet been written into the storage device, among the Key-Value data retained in the memory if the apparatus malfunctions, it is necessary to prevent such loss of data by writing such Key-Value data into the storage device in synch with the writing of that Key-Value data into the memory.

Accordingly, when an SSD is used as the storage device in this kind of server apparatus, a scheme of reducing, as much as possible, the deterioration in the data writing characteristics of the SSD caused by the foregoing garbage collection is required.

The present invention was devised in view of the foregoing points, and proposed are a data management apparatus and a data management method capable of reducing the occurrence of garbage collection, and preventing the deterioration in the performance of writing data into an SSD.

Solution to Problem

In order to resolve the foregoing problems, the present invention provides a data management apparatus which stores key-value data, configured from a value as data to be stored and a key unique to the value, in an SSD (Solid State Drive), wherein the data management apparatus comprises: a data management unit which manages the key-value data stored in the SSD; and a file management unit which creates, as required, a file of a predetermined size in a storage area of the SSD in accordance with a request from the data management unit, and manages the created file, wherein the file has a file size of an integral multiple of a block, which is a unit of erasure of data in the SSD, and wherein the data management unit: requests the file management unit to additionally write the key-value data to be stored in the file, and manages a number of the effective key-value data in each of the files by invalidating pre-update data of the updated key-value data and the deleted key-value data in the file; and requests the file management unit to delete the file no longer storing the effective key-value data.

Moreover, the present invention additionally provides a data management method which stores key-value data, configured from a value as data to be stored and a key unique to the value, in an SSD (Solid State Drive), wherein the data management apparatus comprises: a data management unit which manages the key-value data stored in the SSD; and a file management unit which creates, as required, a file of a predetermined size in a storage area of the SSD in accordance with a request from the data management unit, and manages the created file, wherein the file has a file size of an integral multiple of a block, which is a unit of erasure of data in the SSD, and wherein the data management method comprises: a first step of the data management unit requesting the file management unit to additionally write the key-value data to be stored in the file, and managing a number of the effective key-value data in each of the files by invalidating pre-update data of the updated key-value data and the deleted key-value data in the file; and a second step of the data management unit requesting the file management unit to delete the file no longer storing the effective key-value data.

According to the data management apparatus and the data management method of the present invention, since a file has a file size of an integral multiple of a block of an SSD, garbage collection will not occur in the SSD upon deleting a file that no longer stores effective key-value data. Moreover, according to the data management apparatus and the data management method of the present invention, since files no longer storing effective key-value data are sequentially deleted, it is possible to reduce the occurrence of garbage collection caused by the writing of key-value data going around the storage area of the SSD.

Advantageous Effects of Invention

According to the present invention, it is possible to inhibit, as much as possible, the occurrence of garbage collection in an SSD, and consequently realize a data management apparatus and a data management method capable of reducing the occurrence of garbage collection, and preventing the deterioration in the performance of writing data into an SSD.

BRIEF DESCRIPTION OF DRAWINGS

FIG. 5 is a conceptual diagram showing the configuration of the Key-Value management table according to the second embodiment.

FIG. 6 is a conceptual diagram showing the configuration of the file management table according to the second embodiment.

DESCRIPTION OF EMBODIMENTS

An embodiment of the present invention is now explained in detail with reference to the drawings.

Figure 1:
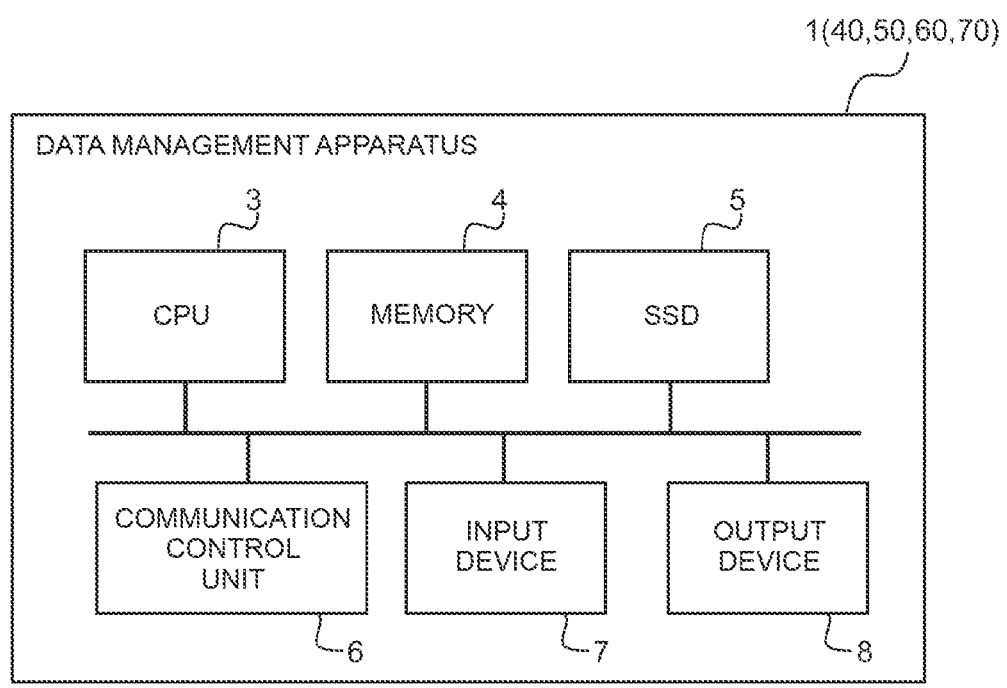
FIG. 1 is a block diagram showing the hardware configuration of the data management apparatus according to the first to fifth embodiments.

(1) First Embodiment (1-1) Configuration of Data Management Apparatus According to this Embodiment In FIG. 1, reference numeral 1 represents the overall data management apparatus according to this embodiment. The data management apparatus 1 is a computer device configured from a personal computer, a workstation or a mainframe, and comprises a CPU (Central Processing Unit) 3, a memory 4, an SSD 5, a communication control unit 6, an input device 7 and a display device 8 which are mutually connected via an internal bus 2.

The CPU 3 is a processor that governs the operational control of the overall data management apparatus 1. Moreover, the memory 4 is a semiconductor memory that is used as a primary storage device, and, in addition to being used as a work memory of the CPU 3, it is also used as a cache memory for temporarily storing the Key-Value data to be read from and written into the SSD 5.

The SSD 5 is a secondary storage device configured from a non-volatile semiconductor memory such as a flash memory, and is used for storing various programs and various data for a long period of time. The communication control unit 6 is configured, for example, from an NIC (Network Interface Card), and performs protocol control during communication with external equipment.

The input device 7 is configured, for example, from a keyboard and a mouse, and is used by a user for performing various operational inputs to the data management apparatus 1. Moreover, the display device 8 is configured from a liquid crystal display or the like, and is used for displaying various screens and various types of information.

Figure 2:
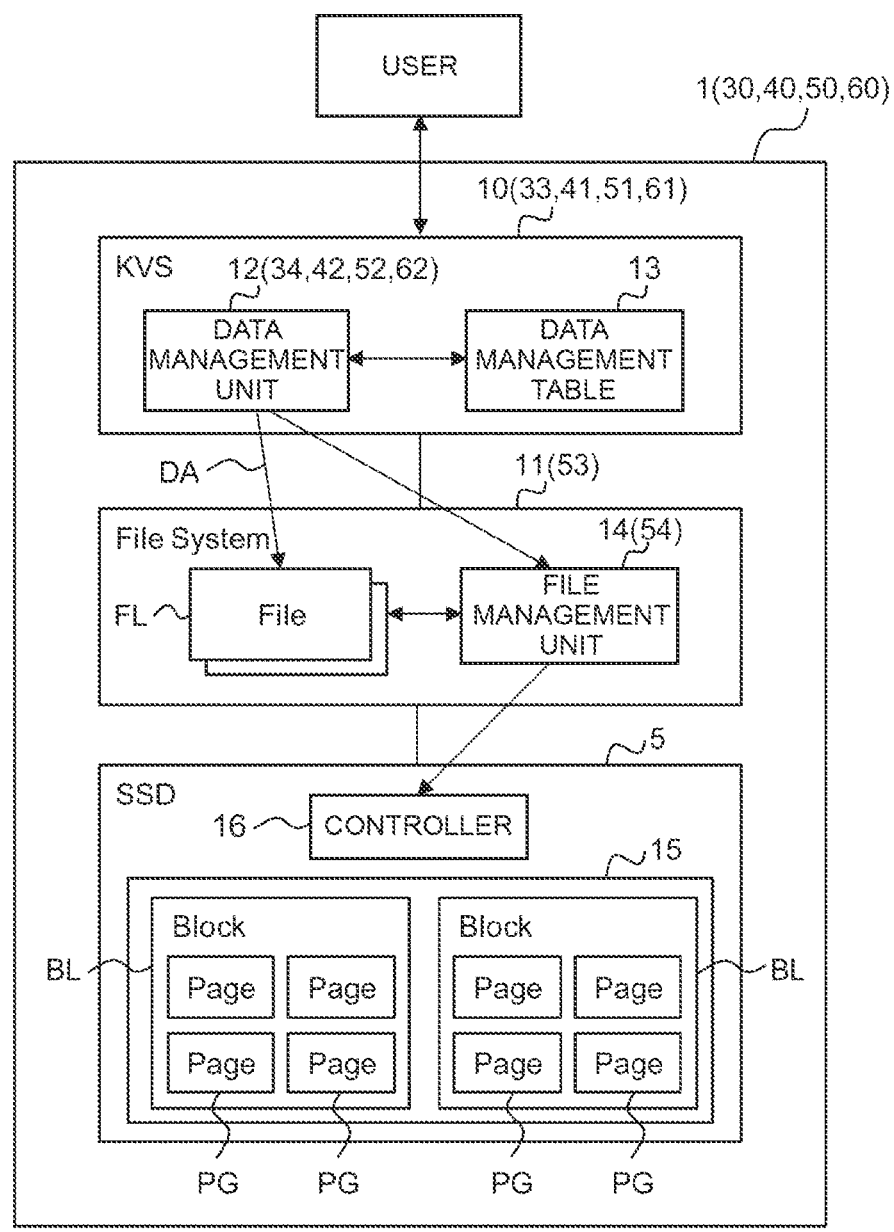
FIG. 2 is a block diagram showing the logical configuration concerning the KVS function of the data management apparatus according to the first to fifth embodiments.

FIG. 2 shows the logical configuration of the data management apparatus 1 in relation to the KVS function that is equipped in the data management apparatus 1. As evident from FIG. 2, the data management apparatus 1 is configured by comprising a KVS 10 and a file system 11 as its functions.

The KVS 10 is a function that is realized by the CPU 3 executing a KVS program (not shown) stored in the memory 4. The KVS 10 comprises a data management unit 12 having a function of managing the Key-Value data DA stored in the SSD 5. The data management unit 12 requests the file system 11 to write the requested Key-Value data DA into the SSD 5 in response to a write request from the user which was input via the input device 7, and manages the storage location of that Key-Value data in the SSD 5. Moreover, the data management unit 12 identifies the storage location of the Value corresponding to the designated Key in the SSD 5 in response to the read request of the Key-designated Value from the user, and requests the file system 11 to read that Value from the SSD 5.

The file system 11 is a function that is realized by the CPU 3 executing a file system program (not shown) stored in the memory 4, and comprises a file management unit 14. The file management unit 14 creates, as required, a file of a predetermined size in the storage area 15 of the SSD 5 in accordance with a request from the data management unit 12 of the KVS 10, and manages the created file. The file management unit 14 stores the requested Key-Value data DA by writing that Key-Value data DA in a file FL in response to a request from the data management unit 12.

The SSD 5 is configured from a storage area 15 provided by a semiconductor memory such as a flash memory, and a controller 16 which controls the reading and writing of data from and into the storage area 15. The storage area 15 is managed by the controller 16 by being divided into a plurality of blocks BL of a predetermined size, and each block BL is further managed by being divided into a plurality of pages PG. As described above, the writing of data into the SSD 5 is performed in page PG units, and the erasure of data from the SSD 5 is performed in block BL units.

(1-2) Data Management Method of this Embodiment

The data management method performed in the data management apparatus 1 of this embodiment is now explained. One feature of the data management apparatus 1 is that it creates a file FL having a file size of an integral multiple of a block BL of the SSD 5 in the storage area 15 of the SSD 5, additionally writes the Key-Value data DA to be stored in the file FL, manages the number of effective Key-Value data DA in each of the files FL, and sequentially deletes the files FL no longer storing the effective Key-Value data DA.

In effect, with the data management apparatus 1, the data management unit 12 of the KVS 10 initially requests the file system 11 to create the file FL for writing the Key-Value data DA on the one hand, and thereafter requests the file management unit 14 of the file system 11 to additionally write the Key-Value data DA for which a write request was received from the user into the created file FL.

Moreover, when it is no longer possible to additionally write new Key-Value data DA in that file FL, the data management unit 12 requests the file management unit 14 to create a new file FL for writing the Key-Value data DA on the one hand, and thereafter requests the file management unit 14 to additionally write, in the new file FL, the Key-Value data DA for which a write request was received from the user. The data management unit 12 thereafter repeats the same processing.

Here, the data management unit 12 deems the pre-update data of the updated Key-Value data DA and the deleted Key-Value data DA to be invalidated data, and manages the Key-Value data DA which has not been invalidated (effective Key-Value data DA), regarding at which location of which file FL it is stored, by using a data management table 13 created in the memory 4 (FIG. 1).

Moreover, the data management unit 12 additionally manages the number of effective Keys (number of effective Key-Value data DA) stored in each of the files FL and the unused capacity of each of the files FL by using the data management table 13. In the foregoing case, when the data management unit 12 requests the file management unit 14 to create a new file FL, the data management unit 12 manages the unused capacity of the file FL that was previously used for the writing of the Key-Value data DA as "0". Subsequently, the data management unit 12 requests the file management unit 14 of the file system to delete the file FL in which the unused capacity is "0" (that is, the file FL that is no longer used as the write destination of the new Key-Value data DA) and in which all stored Key-Value data DA was invalidated as a result of being updated or deleted (that is, in which the number of effective Key-Value data became "0").

In the foregoing case, with the data management apparatus 1, since the size of the foregoing file FL is selected to be the integral multiple of the block BL of the SSD 5 as described above, garbage collection will not occur in the SSD 5 even when the file management unit 14 of the file system 11 deletes the file FL from the SSD 5. Moreover, with the data management apparatus 1, since the files FL no longer storing the effective Key-Value data are sequentially deleted as described above, it is possible to reduce the occurrence of garbage collection caused by the writing of the Key-Value data DA going around the storage area 15 of the SSD 5. Thus, according to the data management apparatus 1, it is possible to inhibit, as much as possible, the occurrence of garbage collection in the SSD 5.

Figure 3:
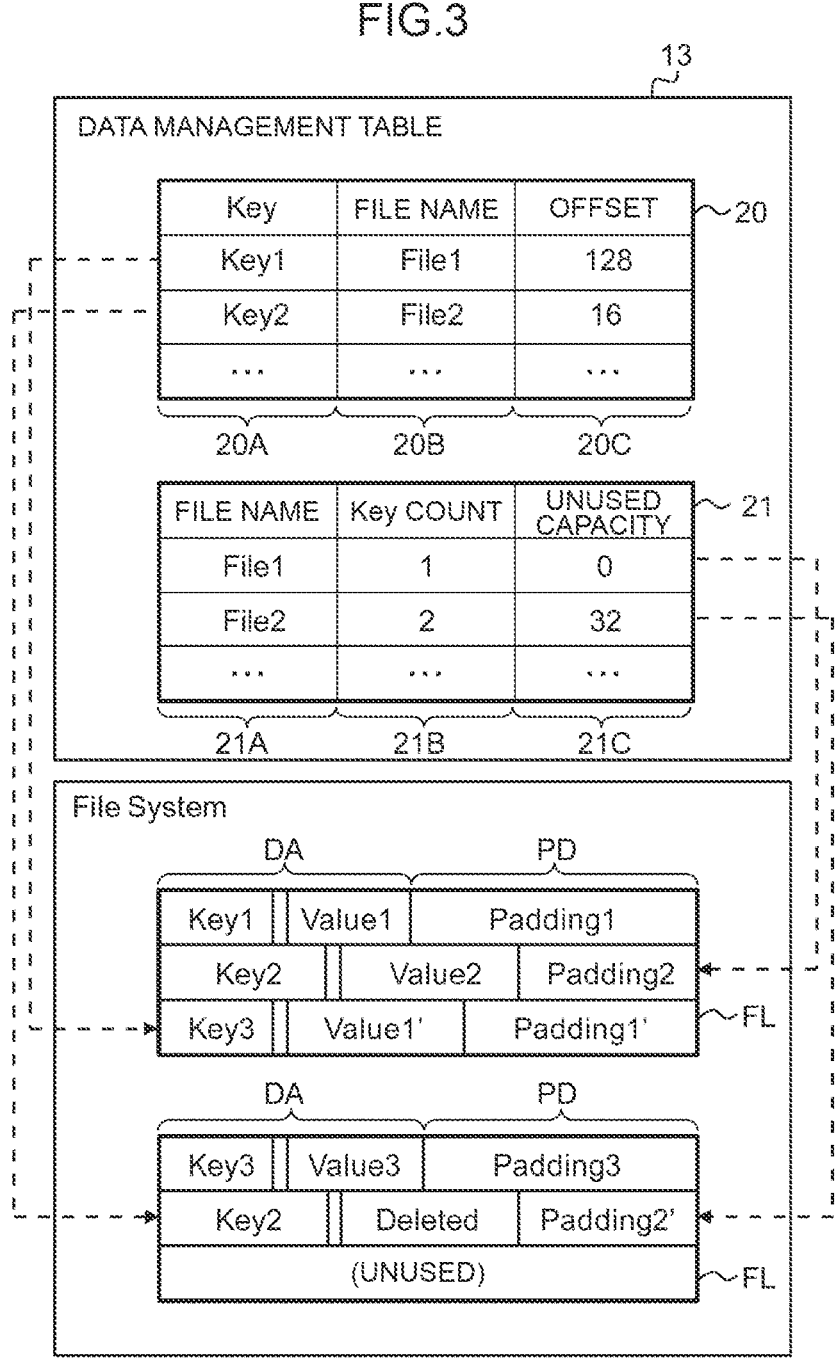
FIG. 3 is a conceptual diagram showing the configuration of the Key-Value management table and the file management table, and the data format of the Key-Value data to be stored in the SSD.

FIG. 3 shows the configuration of the foregoing data management table 13, and the data format of the Key-Value data DA stored in the SSD 5. As shown in the upper section of FIG. 3, the data management table 13 is configured from a Key-Value management table 20 and a file management table 21.

The Key-Value management table 20 is a table that is used for managing the relation of the Key and the Value, and is configured, as shown in FIG. 3, from a Key column 20A, a file name column 20B and an offset column 20C.

The Key column 20A stores the Key that is assigned to each Key-Value data DA written into the SSD 5, and the file name column 20B stores the file name of the file FL in which is written the Value associated with the corresponding Key. Moreover, the offset column 20C stores the offset amount (for instance, in kilobyte units) of the Value associated with the corresponding Key from the top of the corresponding file FL.

Accordingly, in the case of FIG. 3, the Key-Value data DA assigned with a Key of "Key1" is stored at a location that is "128" from the top of the file FL named "File1", and the Key-Value data DA assigned with a Key of "Key2" is stored at a location that is "16" from the top of the file FL named "File2".

Moreover, the file management table 21 is a table that is used for managing the number of Keys (more accurately, the number of Key-Value data DA) stored in each of the files FL stored in the SSD 5, and the unused capacity of each of the files FL, and is configured from a file name column 21A, a Key count column 21B and an unused capacity column 21C.

The file name column 21A stores the file name of each file FL created in the SSD 5, and the Key count column 21B stores the number of effective Keys (more accurately, the number of effective Key-Value data DA) stored in the corresponding file FL. Moreover, the unused capacity column 21C stores the current unused capacity (for instance, in megabyte units) of the corresponding file FL.

Accordingly, in the case of FIG. 3, with regard to the file FL named "File1", the number of effective Keys (number of effective Key-Value data DA) is "1", and the unused capacity is "0", and with regard to the file FL named "File2", the number of effective Keys is "2", and the unused capacity is "32".

Meanwhile, as shown in the lower section of FIG. 3, the Key-Value data DA is added with padding data PD as needed and stored in the file FL so that it will not extend across the pages PG, and consequently the blocks BL, in the storage area 15 (FIG. 2) of the SSD 5. Accordingly, the data size of the padding data PD is selected so that, as a whole, the data size of the Key-Value data DA added with the padding data PD will be an integral multiple that is closest to the size of the page PG (page size) in the SSD 5.

For example, when the data size of the Key-Value data DA is 0.8 times the page size, padding data PD having a data amount that is 0.2 times the page size is added to the Key-Value data DA, and when the data size of the Key-Value data DA is 2.3 times the page size, padding data PD having a data amount that is 0.7 times the page size is added to the Key-Value data DA.

Note that FIG. 3 shows an example where the file FL named "File1" corresponding to the uppermost entry (line) of the file management table 21 stores the pre-update data of the Key-Value data DA configured from a Key named "Key1" and Value data named "Value1", pre-update data of the Key-Value data DA configured from a Key named "Key2" and Value data named "Value2", and post-update data of the Key-Value data DA configured from a Key named "Key1" and Value data named "Value1".

Moreover, FIG. 3 shows that the file FL named "File2" corresponding to the entry in the second line of the file management table 21 previously stored the Key-Value data DA configured from a Key named "Key3" and Value data named "Value3", and post-update data of the Key-Value data DA configured from a Key named "Key2" and Value data named "Value2", but the Key-Value data DA named "Value2" has been subsequently deleted ("Deleted").

Figure 4:
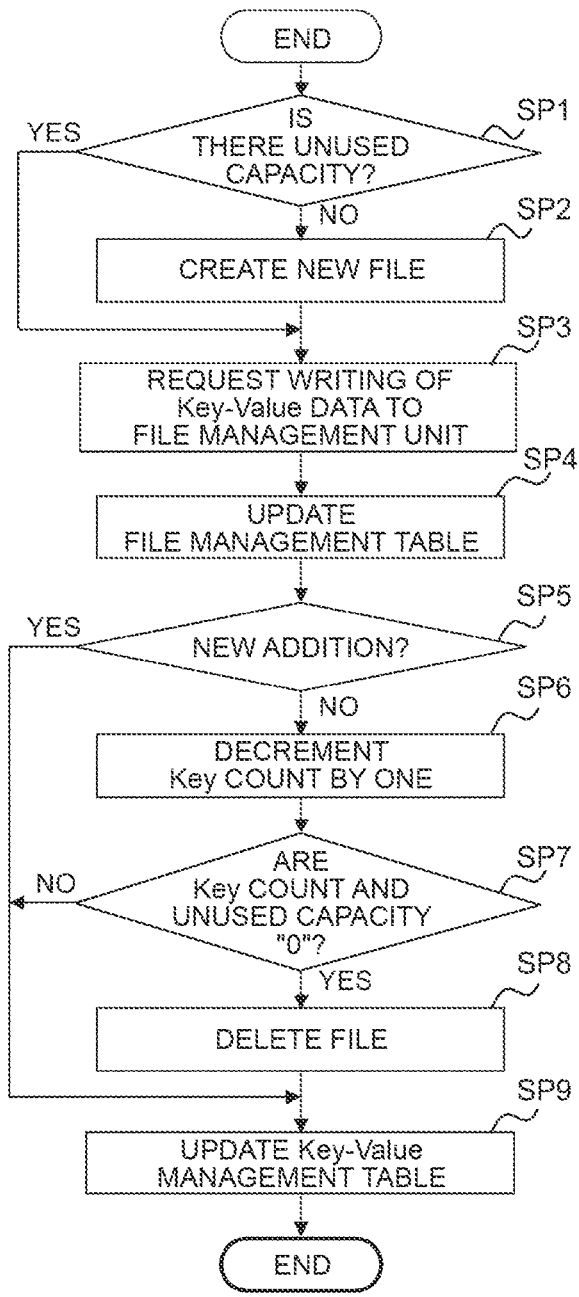
FIG. 4 is a flowchart showing the processing routine of the data write processing according to the first embodiment.

FIG. 4 shows the processing routine of the data write processing to be executed by the data management unit 12 of the KVS 10 upon writing the Key-Value data DA into the file FL in the SSD 5. The data management unit 12 instructs the file management unit 14 of the file system 11 to write the requested Key-Value data DA into the corresponding file FL in the SSD 5 according to the processing routine shown in FIG. 4.

In effect, the data management unit 12 starts this data write processing upon receiving a data write request and the Key-Value data DA to be stored from the user, and foremost refers to the file management table 21 (FIG. 3), and determines whether the file (this is hereinafter referred to as the "data write destination file" as appropriate) FL which is currently being used for the writing of the Key-Value data DA has sufficient unused capacity for the writing of the Key-Value data DA to be stored (SP1).

The data management unit 12 proceeds to step SP3 upon obtaining a positive result in the foregoing determination. Meanwhile, upon obtaining a negative result in the determination of step SP1, the data management unit 12 changes the current unused capacity of the data write destination file FL in the file management table 21 to "0", and requests the file management unit 14 of the file system 11 to create a new data write destination file FL (SP2).

Consequently, the file management unit 14 creates, in the SSD 5, a file FL having a predetermined size of an integral multiple of a block size in the SSD 5 in response to the foregoing request. The file management unit 14 thereafter handles the thus created file FL as the new data write destination file FL until it creates the subsequent data write destination file FL.

Next, the data management unit 12 sends the Key-Value data DA to be stored and the data write request thereof to the file management unit 14 of the file system 11 (SP3). Consequently, the file management unit 14 adds the padding data PD to the Key-Value data DA provided from the data management unit 12 so that the total data amount becomes an integral multiple that is closest to the page size of the SSD 5, and thereafter causes the controller 16 of the SSD 16 to write the Key-Value data DA in the data write destination file FL by providing the Key-Value data DA and the write request thereof to the controller 16 of the SSD 5.

Subsequently, the data management unit 12 updates the Key count column 21B and the unused capacity column 21C of the entries corresponding to the data write destination file FL in the file management table 21 (SP4). Specifically, the data management unit 12 increments the number of Keys stored in the Key count column 21B of that entry by "1", and updates the unused capacity stored in the unused capacity column 21C to a value obtained by subtracting the Key-Value data DA written into the data write destination file FL at such time.

Thereafter, the data management unit 12 determines whether the Key-Value data DA written into the data write destination file FL in step SP3 was newly added in the KVS 10 (SP5). The data management unit 12 proceeds to step SP9 upon obtaining a positive result in the foregoing determination.

Meanwhile, to obtain a negative result in the determination of step SP5 means that the writing of the Key-Value data DA is the update of the previously written Key-Value data DA. Consequently, here, in order to invalidate the pre-update Key-Value data DA in the Key-Value data DA, the data management unit 12 refers to the corresponding entries in the Key-Value management table 20, and decrements the number of Keys stored in the Key count column 21B of the entry corresponding to the file (this is hereinafter referred to as the "pre-update data storing file") FL storing the pre-update Key-Value data DA in the file management table 21 by "1".

Next, the data management unit 12 refers to the file management table 21 and determines whether the number of effective Keys (number of effective Key-Value data DA) in the pre-update data storing file FL became "0" and the unused capacity of the file FL is "0" as a result of the processing of step SP6 (SP7). The data management unit 12 proceeds to step SP9 upon obtaining a negative result in the foregoing determination.

Meanwhile, upon obtaining a positive result in the determination of step SP7, the data management unit 12 requests the file system 11 to delete the pre-update data storing file FL (SP8).

Consequently, the file management unit 14 of the file system 11 that received the foregoing request sends an existing TRMI command to the controller 16 (FIG. 2) of the SSD 5 so as to instruct the invalidation of all pages contained in that pre-update data storing file FL. Moreover, the controller 16 of the SSD 5 that received the foregoing TRMI command erases the Key-Value data stored in the corresponding page in the SSD 5. The foregoing pre-update data storing file FL is thereby deleted from the SSD 5.

Subsequently, the data management unit 12 updates the contents of the Key-Value management table 20 (SP9). Specifically, when the Key-Value data DA to be stored is newly stored in the SSD 5, the data management unit 12 registers that Key-Value data DA in the Key-Value management table 20. Moreover, when the writing of the Key-Value data DA is the update of the Key-Value data DA previously stored in the SSD 5, the data management unit 12 updates as needed, among the entries of the Key-Value management table 20, the file name stored in the file name column 20B (FIG. 3) or the offset amount stored in the offset column 20C (FIG. 3) of entries corresponding to that Key-Value data DA. The data management unit 12 thereafter ends the data write processing.

(1-3) Effect of this Embodiment

As described above, with the data management apparatus 1 of this embodiment, since a file FL having a file size of an integral multiple of a block in the storage area 15 of the SSD 5 is created, and the Key-Value data DA to be stored is additionally written into that file FL on the one hand, and the number of effective Keys (number of effective Key-Value data DA) in each of the files FL is managed, and the files FL in which the number of effective Keys becomes "0" are sequentially deleted, it is possible to inhibit, as much as possible, the occurrence of garbage collection in the SSD 5. Consequently, according to the data management apparatus 1, it is possible to reduce the occurrence of garbage collection, and prevent the deterioration in the performance of writing data into the SSD 5.

(2) Second Embodiment

With the foregoing data management apparatus 1 according to the first embodiment, since the Key-Value data DA is additionally written into the data write destination file FL as described above in order to inhibit the occurrence of garbage collection, the Key-Value data DA that was invalidated as a result of being updated or deleted is not independently deleted from the pre-update data storing file FL. Thus, with the data management apparatus 1 according to the first embodiment, there is a possibility that a file FL containing numerous invalidated Key-Value data DA will exist in the SSD 5, and there is a problem in that the usage efficiency of the SSD 5 may deteriorate.

Thus, with the data management apparatus 30 of this embodiment, in cases where the Key-Value data DA stored in the SSD 5 is updated, if the total data amount of the effective Key-Value data DA in the pre-update data storing file FL in which the pre-update data of the Key-Value data DA has been written falls below a predetermined threshold (for instance, 50[%] of the file size), all effective Key-Value data DA in that pre-update data storing file FL is copied to the data write destination file FL, and then that file FL is deleted from the SSD 5.

FIG. 5 shows the Key-Value management table 31 of this embodiment that is used in substitute for the Key-Value management table 20 of the first embodiment described above with reference to FIG. 3 in this kind of data management apparatus 30. The Key-Value management table 31 is configured from a Key column 31A, a file name column 31B, an offset column 31C and a data size column 31D.

The Key column 31A, the file name column 31B and the offset column 31C each stores the same information as the information stored in the Key column 20A, the file name column 20B and the offset column 20C of the Key-Value management table 20 of the first embodiment. Moreover, the data size column 31D stores the data size including the padding data PD (FIG. 3) of the corresponding Key-Value data DA.

Moreover, FIG. 6 shows the file management table 32 of this embodiment that is used in substitute for the file management table 21 of the first embodiment described above with reference to FIG. 3. The file management table 32 is configured from a file name column 32A, a Key count column 32B, an unused capacity column 32C and a total effective data amount column 32D.

The file name column 32A, the Key count column 32B, and the unused capacity column 32C each stores the same information as the information stored in the file name column 21A, the Key count column 21B and the unused capacity column 21C of the file management table 21 of the first embodiment. Moreover, the total effective data amount column 32D stores the total data amount (this is hereinafter referred to as the "total effective data amount") of the effective Key-Value data (including the padding data PD) DA in the corresponding file FL.

Figure 7:
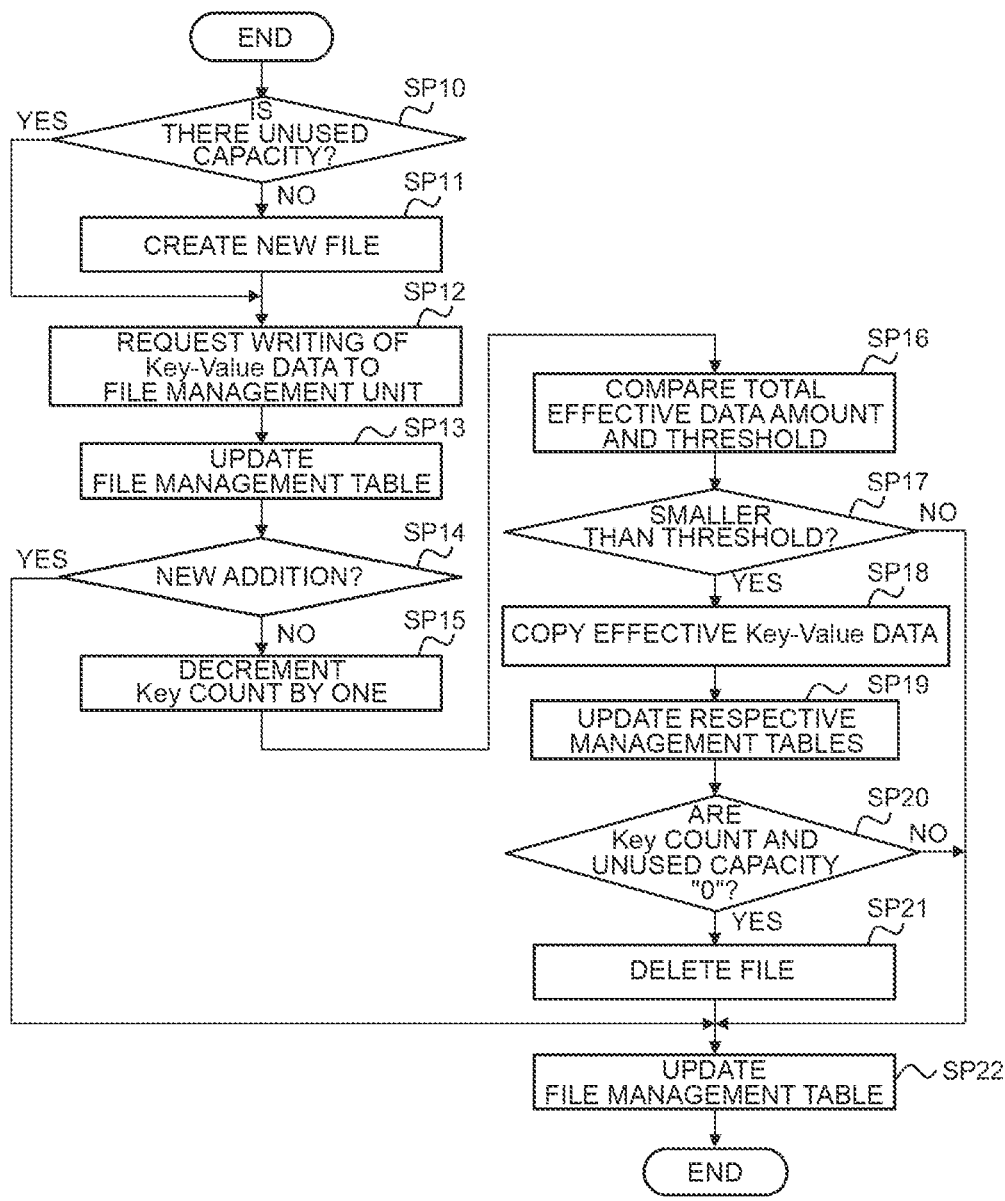
FIG. 7 is a flowchart showing the processing routine of the data write processing according to the second to fifth embodiments.

FIG. 7 shows the data write processing routine of this embodiment to be executed by the data management unit 34 (FIG. 2) of the KVS 33 (FIG. 2) of this embodiment upon writing the Key-Value data DA into a file FL in the SSD 5. The data write processing of this embodiment is performed in the same manner as the data write processing of the first embodiment excluding the point that the processing in step SP13 is different, and the point that the processing of step SP16 to step SP19 has been added.

In effect, the data management unit 34 starts this data write processing upon receiving a data write request and the Key-Value data DA to be stored from the user, and performs the processing of step SP10 to step SP12 in the same manner as the processing of step SP1 to step SP3 of FIG. 4.

Next, the data management unit 34 updates the file name column 32A, the Key count column 32B, the unused capacity column 32C and the total effective data amount column 32D, respectively, of the entries corresponding to the data write destination file FL in the file management table 32 (SP13).

Subsequently, the data management unit 34 determines whether the Key-Value data DA was newly added in the KVS 33 (SP14). This determination is made by determining whether the Key of the Key-Value data DA to be stored has not yet been registered in the Key-Value management table 31. The data management unit 34 proceeds to step SP22 upon obtaining a positive result in the foregoing determination.

Meanwhile, upon obtaining a negative result in the determination of step SP14, in order to invalidate the pre-update data of the Key-Value data DA, the data management unit 34 refers to the file name column 31B of the entry in which the same Key as the Key of the Key-Value data DA to be stored is stored in the Key column 31A of the Key-Value management table 31, identifies the file (pre-update data storing file) FL storing the pre-update data of the Key-Value data DA, and decrements the number of Keys stored in the Key count column 32B of the entry corresponding to the pre-update data storing file FL in the file management table 32 by "1". Furthermore, the data management unit 34 refers to the data size column 31D of the same entry of the foregoing Key-Value management table 31, identifies the pre-update data size of the Key-Value data DA, and decreases the effective data amount column 32D of the same entry of the foregoing file management table 32 by the pre-update data size.

Subsequently, the data management unit 34 reads, from the file management table 32, the total effective data amount of the effective Key-Value data DA in the pre-update data storing file FL, and compares the read total effective data amount and the pre-set threshold (SP16). The data management unit 34 thereafter determines whether the total effective data amount is smaller than the threshold based on the comparative result (SP17).

The data management unit 34 proceeds to step SP22 upon obtaining a negative result in the foregoing determination. Meanwhile, upon obtaining a positive result in the determination of step SP17, the data management unit 34 instructs the file management unit 14 of the file system 11 to copy the effective Key-Value data DA in the pre-update data storing file FL to the data write destination file FL (SP18). Consequently, the file management unit 14 copies all effective Key-Value data DA from the pre-update data storing file FL to the data write destination file FL as instructed.

Moreover, the data management unit 34 updates the Key-Value management table 31 and the file management table 32, respectively, in accordance with the contents of the data copy that was performed in step SP18 (SP19). As a result, the number of effective Keys (number of Key-Value data) stored in the Key count column 42B of the entry corresponding to the pre-update data storing file FL in the file management table 32 is updated to "0".

Thereafter, the data management unit 34 refers to the file management table 21, and determines whether the number of Keys (number of Key-Value data) of the pre-update data storing file FL has become "0" and whether the unused capacity of the pre-update data storing file FL is "0" as a result of the processing of step SP19 (SP20). Note that the data management unit 34 will always obtain a positive result in the foregoing determination.

Consequently, the data management unit 34 thereafter performs the processing of step SP21 and step SP22 in the same manner as step SP8 and step SP9 of the data write processing of FIG. 4. However, in step SP22, the data management unit 34 also updates the data size column 31 of the Key-Value management table 31 in addition to the processing of step SP9. The data management unit 34 thereafter ends this data write processing.

According to the data management apparatus 30 of this embodiment described above, the file FL in which the total effective data amount falls below the threshold due to the update of the stored Key-Value data DA can be deleted on a case-by-case basis. Consequently, according to the data management apparatus 30, it is possible to yield the effect of improving the usage efficiency of the SSD 5 in addition to the effects that can be obtained with the data management apparatus 1 of the first embodiment.

(3) Third Embodiment

With the data management apparatus 30 according to the first and second embodiments described above, padding data PD (FIG. 3) is added to the Key-Value data DA so that the total size becomes an integral multiple of the page size so that the Key-Value data DA does not extend across pages upon writing the Key-Value data DA into the SSD 5. Thus, according to the data management apparatus 30, the usage efficiency of the SSD 5 will deteriorate as much as the padding data PD.

Thus, with the data management apparatus 40 (FIG. 2) of this embodiment, in step SP18 of the data write processing according to the second embodiment described above with reference to FIG. 7, upon copying the effective Key-Value data DA written into the pre-update data storing file FL to the data write destination file FL, the data management unit 42 (FIG. 2) of the KVS 41 (FIG. 2) requests the file management unit 14 (FIG. 2) of the file system 11 to remove each padding data PD from the Key-Value data DA.

Consequently, the file management unit 14 that received the foregoing instruction deletes the padding data PD added to the individual effective Key-Value data DA written into the original file FL, adds padding data PD so that the total data size of the Key-Value data DA becomes an integral multiple that is closest to the page PG (FIG. 2), and thereafter collectively writes the effective Key-Value data DA into the data write destination file FL.

According to the data management apparatus 40 of this embodiment described above, since it is possible to delete excess padding data PD upon copying the effective Key-Value data DA written into the pre-update data storing file FL to the data write destination file FL, it is possible to yield the effect of further improving the usage efficiency of the SSD 5 in addition to the effects that can be obtained with the data management apparatus 1 of the first embodiment.

(4) Fourth Embodiment

With a standard SSD, the logical address handled by the file system is converted into an internal physical address by the controller of the SSD. Since the contents of this conversion processing cannot be recognized by the file system, even if the file size is designated upon creating a file and contiguous areas are secured in the file system, there are cases where the pages in the block of the SSD are not secured as contiguous areas. Generally speaking, contiguous pages of the SSD will be assigned for sequential writing, but in a state where data is written randomly, there is no guarantee that contiguous areas can be assigned.

Thus, in this embodiment, the data management apparatus (1, 30, 40) according to the first to third embodiments is provided with an interface (command) so that the SSD 5 assigns contiguous pages PG (FIG. 2) in the block BL (FIG. 2) to the file FL, and the top of the file FL becomes the top of the contiguous pages in the block BL.

With the data management apparatus 50 of this embodiment, the data management unit 52 (FIG. 2) of the KVS 51 (FIG. 2) sends the foregoing command (this is hereinafter referred to as the "contiguous area assignment designation command") to the file system 63 (FIG. 2) in step SP2 of the data write processing described above with reference to FIG. 4, or in step SP11 of the data write processing described above with reference to FIG. 7.

Moreover, the file management unit 54 (FIG. 2) of the file system 53 (FIG. 2) that received the foregoing contiguous area assignment designation command sends a request corresponding to the contiguous area assignment designation command to the controller 16 of the SSD 5. The file management unit 54 of the file system 53 will consequently create a file FL of contiguous areas in the file system 53, and the controller 16 will secure contiguous storage areas as the storage area of the file FL in the SSD 5.

According to the data management apparatus 50 of this embodiment described above, since the file FL is created on contiguous storage areas of the SSD 5, data deletion is performed in block units during the deletion of the file FL in the data write processing described above with reference to FIG. 4 or in step SP21 of the data write processing described above with reference to FIG. 7. Consequently, according to the data management apparatus 50, it is possible to yield the effect of accelerating the deletion processing of the file FL in addition to the effects that can be obtained with the data management apparatus 1, 30, 40 of the first to third embodiments.

(5) Fifth Embodiment

With the data management apparatus 40 of the second embodiment, in step SP18 of the data write processing described above with reference to FIG. 7, the data write destination file FL is copied from the pre-update data storing file FL upon copying the effective Key-Value data DA in the pre-update data storing file FL to the data write destination file FL.

In the foregoing case, when the KVS 31 is an in-memory model, there are cases where the Key-Value data DA to be copied exists in the memory 4 (FIG. 1). In such a case, the copy speed can be improved by copying the Key-Value data DA to be copied from the memory 4 to the data write destination file FL, rather than copying such Key-Value data DA to be copied from the pre-update data storing file FL to the data write destination file FL.

Thus, with the data management apparatus 60 (FIG. 2) of this embodiment, in step SP18 of the data write processing described above with reference to FIG. 7, when the Key-Value data DA exists in the memory 4 upon copying the effective Key-Value data DA stored in the pre-update data storing file FL to the data write destination file FL, the Key-Value data DA is copied from the memory 4 to the data write destination file FL.

In effect, with the data management apparatus 60, in step SP18 of the data write processing described above with reference to FIG. 7, the data management unit 62 (FIG. 2) of the KVS 61 (FIG. 2) determines whether the effective Key-Value data DA in the pre-update data storing file FL exists in the memory 4.

Subsequently, the data management unit 62 reads the Key-Value data DA existing in the memory 4 among the effective Key-Value data DA from the memory 4, and sends, to the file management unit 14 of the file system 11, the read Key-Value data DA together with a data write request for writing the Key-Value data DA in the data write destination file FL. Consequently, the file management unit 14 writes the Key-Value data DA, which was provided together with the data write request thereof from the data management unit 62, into the data write destination file FL.

Moreover, with regard to the Key-Value data DA that does not exist in the memory 4 among the effective Key-Value data DA, the data management unit 62 instructs the file management unit 14 to copy such Key-Value data DA from the pre-update data storing file FL storing the pre-update data of that Key-Value data DA to the data write destination file FL. Consequently, the file management unit 14 copies the Key-Value data DA written into the pre-update data storing file FL to the data write destination file FL according to the foregoing instruction.

According to the data management apparatus 60 of this embodiment described above, upon copying the effective Key-Value data from the pre-update data storing file FL, which previously stored the pre-update data of the Key-Value data DA, to the data write destination file FL in step SP18 of the data write processing described with reference to FIG. 7, it is possible to reduce the processing load required for reading the Key-Value data DA to be copied from the pre-update data storing file FL. Consequently, according to the data management apparatus 60 of this embodiment, it is possible to yield the effect of improving the copy speed in addition to the effects that can be obtained with the data management apparatus 30 of the second embodiment.

(6) Other Embodiments

Note that, while the foregoing first to fifth embodiments described a case of the data management apparatus 1, 40, 50, 60, 70 retaining the SSD 5 as an internal storage device, the present invention is not limited thereto, and the present invention can also be applied to cases where the data management apparatus 1, 40, 50, 60, 70 is using the SSD 5 as an external storage device.

Moreover, while the foregoing second, third and fifth embodiments described a case where the padding data PD is removed from each Key-Value data DA and the Key-Value data DA is collectively copied to the data write destination file FL upon copying, to the data write destination file FL, the pre-update data storing file FL and the effective Key-Value data DA stored in the memory 4, the present invention is not limited thereto, and, among the foregoing effective Key-Value data DA, it will suffice so as long as the Values are subject to data compression and then copied to the data write destination file FL. Consequently, it will be possible to yield the effect of being able to further improve the usage efficiency of the SSD 5.

REFERENCE SIGNS LIST 1, 30, 40, 50, 60 . . . data management apparatus, 3 . . . CPU, 4 . . . memory, 5 . . . SSD, 10, 33, 41, 51, 61 . . . KVS, 11 . . . file system, 12, 34, 42, 52, 62 . . . data management unit, 13 . . . data management table, 14, 54 . . . file management unit, 15 . . . storage area, 16 . . . controller, 20, 31 . . . Key-Value management table, 21, 32 . . . file management table, DA . . . Key-Value data, FL . . . file, BL . . . block, PG . . . page, PD . . . padding data.

The invention claimed is:

1. A data management apparatus which stores key-value data, configured from a value as data to be stored and a key unique to the value, in an SSD (Solid State Drive), wherein the data management apparatus comprises:
a data management unit which manages the key-value data stored in the SSD; and
a file management unit which creates, as required, a file of a predetermined size in a storage area of the SSD in accordance with a request from the data management unit, and manages the created file,
wherein the file has a file size of an integral multiple of a block, which is a unit of erasure of data in the SSD, and
wherein the data management unit:
requests the file management unit to additionally write the key-value data to be stored in the file, and manages a number of effective key-value data in each of the files by invalidating pre-update data of updated key-value data and deleted key-value data in the file, wherein the data management unit invalidates the pre-update data by examining a corresponding key-value data entry in a key-value management table to determine if the key-value data entry is a new entry, and if the entry is not new, decrementing a number of keys stored in a key count column of the entry corresponding to the file, and storing pre-update key-value data in a file management table; and
requests the file management unit to delete the file no longer storing the effective key-value data if the key count and unused capacity of the file are both zero.

2. The data management apparatus according to claim 1, wherein the file management unit writes the key-value data to be stored into the file by adding padding data so that, as a whole, the stored key-value data will be an integral multiple that is closest to a size of a page, which is a data writing unit in the SSD.

3. The data management apparatus according to claim 2, wherein, when a data amount of the effective key-value data in the file is smaller than a pre-set threshold, the data management unit requests the file management unit to copy all of the effective key-value data in that file to another file, and invalidates each of the key-value data in the file as a copy source which was copied to the other file.

4. The data management apparatus according to claim 3, wherein, upon copying the effective key-value data in the file to be deleted to the other file, the data management unit requests the file management unit to delete each of the padding data from each of the key-value data.

5. The data management apparatus according to claim 3, further comprising:
a memory which temporarily stores the key-value data to be written into the SSD, and
wherein, upon copying the effective key-value data in the file to the other file, the data management unit requests the file management unit to write the key-value data stored in the memory into the other file as a copy destination by reading that key-value data from the memory and then writing that key-value data into the other file as the copy destination.

6. The data management apparatus according to claim 1, wherein, upon requesting the file management unit to create the file, the data management unit requests the file management unit to secure contiguous storage areas in the SSD.

7. A data management method performed by a data management apparatus which stores key-value data, configured from a value as data to be stored and a key unique to the value, in an SSD (Solid State Drive), wherein the data management apparatus comprises:
a data management unit which manages the key-value data stored in the SSD; and
a file management unit which creates, as required, a file of a predetermined size in a storage area of the SSD in accordance with a request from the data management unit, and manages the created file,
wherein the file has a file size of an integral multiple of a block, which is a unit of erasure of data in the SSD, and wherein the data management method comprises:
a first step of the data management unit requesting the file management unit to additionally write the key-value data to be stored in the file, and managing a number of effective key-value data in each of the files by invalidating pre-update data of updated key-value data and deleted key-value data in the file, wherein the invalidating of the pre-update data includes the data management unit examining a corresponding key-value data entry in a key-value management table to determine if the key-value data entry is a new entry, and if the entry is not new, decrementing a number of keys stored in a key count column of the entry corresponding to the file; and
a second step of the data management unit requesting the file management unit to delete the file no longer storing the effective key-value data if the key count and unused capacity of the file are both zero.

8. The data management method according to claim 7, wherein, in the first step, the file management unit writes the key-value data to be stored into the file by adding padding data so that, as a whole, the stored key-value data will be an integral multiple that is closest to a size of a page, which is a data writing unit in the SSD.

9. The data management method according to claim 8, wherein, in the second step, when a data amount of the effective key-value data in the file is smaller than a pre-set threshold, the data management unit requests the file management unit to copy all of the effective key-value data in that file to another file, and invalidates each of the key-value data in the file as a copy source which was copied to the other file.

10. The data management method according to claim 9, wherein, in the second step, upon copying the effective key-value data in the file to be deleted to the other file, the data management unit requests the file management unit to delete each of the padding data from each of the key-value data.

11. The data management method according to claim 9, wherein the data management apparatus further comprises:
a memory which temporarily stores the key-value data to be written into the SSD, and
wherein, in the second step, upon copying the effective key-value data in the file to the other file, the data management unit requests the file management unit to write the key-value data stored in the memory into the other file as a copy destination by reading that key-value data from the memory and then writing that key-value data into the other file as the copy destination.

12. The data management method according to claim 7, wherein, in the first step, upon requesting the file management unit to create the file, the data management unit requests the file management unit to secure contiguous storage areas in the SSD.

* * * * *